United States Patent
Kudo et al.

[11] Patent Number: 5,544,986
[45] Date of Patent: Aug. 13, 1996

[54] COOLING AND DUST COLLECTING APPARATUS FOR MACHINE TOOL

[75] Inventors: Shokiku Kudo, Tokyo-to; Masanori Hosoi, Mibu-Machi; Michinobu Kawano, Nitta-Machi, all of Japan

[73] Assignee: Fuji Jukogyo Kabushiki Kaisha, Tokyo, Japan

[21] Appl. No.: 338,749

[22] Filed: Nov. 9, 1994

[30] Foreign Application Priority Data

Dec. 9, 1993 [JP] Japan .................. 5-065776 U

[51] Int. Cl.⁶ .................. B23B 47/34; B23Q 11/10
[52] U.S. Cl. .................. 408/67; 408/61; 409/136; 409/137
[58] Field of Search .................. 408/56, 67, 61; 409/137, 136

[56] References Cited

U.S. PATENT DOCUMENTS

| | | | |
|---|---|---|---|
| 2,944,465 | 7/1960 | Jones | 409/137 |
| 4,037,982 | 7/1977 | Clement | 408/67 |
| 4,915,550 | 4/1990 | Arai et al. | 408/67 |
| 5,332,341 | 7/1994 | Arai et al. | 408/67 |
| 5,332,343 | 7/1994 | Watanabe et al. | 408/67 |

FOREIGN PATENT DOCUMENTS

| | | |
|---|---|---|
| 58-59746 | 4/1983 | Japan . |
| 63-300807 | 12/1988 | Japan . |
| 3-3713 | 1/1991 | Japan . |

*Primary Examiner*—Steven C. Bishop
*Attorney, Agent, or Firm*—Beveridge, DeGrandi, Weilacher & Young L.L.P.

[57] ABSTRACT

Within a hood, pressurized cold air is injected from a cold air injection pipe to the spindle and the cutting tool for a machine tool for cooling them and at the same time air is sucked and discharged through a discharge port provided on the hood from the inside of the hood by means of a vacuum pressure produced by a suction device. When air is discharged, a swirl is generated in the hood by discharged air and by deflected air streams passed through a plurality of guide blades provided at the open end of the hood. The cutting chips are floated up by the swirl and discharged together with air through the discharge port.

9 Claims, 3 Drawing Sheets

COOLING AND DUST COLLECTING APPARATUS FOR MACHINE TOOL

BACKGROUND OF THE INVENTION

1. Technical Field

The present invention relates to a cooling and dust collecting apparatus of a machine tool for cooling a cutter and discharging cutting chips and particularly relates to a cooling and dust collecting apparatus of a centering machine for cooling a center drill and discharging cutting chips.

2. Related Art

There have been proposed various types of cooling and dust collecting apparatuses for machine tools. For example, Japanese Patent Laid-Open Publication No. Toku-Kai-Sho 58-59746 discloses a cooling and dust collecting apparatus for a machine tool in which a drill is surrounded by a hood and the drill is cooled by spraying mist of a cutting oil towards the center of the drill in several directions. Further, Japanese Patent Laid- Open Publication Nos. Toku-Kai-Sho 63-300807 and Toku-Kai-Hei 3-3713 disclose a pressure foot connected to a cutting chip suction device through a hose so as to keep the inside of the pressure foot in the negative pressure state and additionally, compressed air is blown from the vicinity of the front end of the pressure foot in the tangent direction of the drill. The compressed air expands in the pressure foot almost in an adiabatic state, thereby the temperature therein is sharply lowered. The compressed air thus cooled down cooled, cools down the drill of the drilling machine and is discharged to the cutting suction device together with cutting chips.

However, in the abovementioned cooling and dust collecting apparatuses for machine tools, since cutting oil mist or compressed air is blown to a cutter in a nearly horizontal direction, a portion of the cutter extending out of the workpiece is cooled, whereas the portion hidden therein is never cooled. In the type of the apparatus using a blowing oil mist, cutting chips tend to stick to the inside of the hood (pressure foot). Also, in the type of apparatus using blowing compressed air, sufficient air flow for discharging cutting chips can not be obtained in the hood. Consequently, in these types of cooling and dust collecting apparatus, it is difficult to adequately discharge cutting chips, especially when the workpiece is metal having a large specific gravity.

It is known that the heat sources of heating of the cutting tool are the heat generated by cutting and the heat transferred from the cutter driving section. In the prior cooling and dust collecting apparatus, no attention has been paid to the heat transferred from the cutter driving section, and therefore sufficient cooling of the cutting tool has not been achieved.

SUMMARY OF THE INVENTION

It is an object of the present invention to provide a cooling and dust collecting apparatus for machine tool which is capable of cooling the portion of the tool hidden in the workpiece and at the same time cool the portion extending outside the work piece in order to reduce the heat transfer from the cutter driving section.

It is another object of the present invention to provide a cooling and dust collecting apparatus for machine tools which is capable of discharging cutting chips securely by generating a swirl flow of the pressurized cold air after cooling the cutter.

Disclosed is an apparatus comprising:

a hood fixed to the machine tool for enclosing a spindle and a cutting tool of the machine tool;

a plurality of guide blades radially provided at the open end of the hood so as to introduce outside air into the hood through the guide blades;

air injection means provided within the hood for injecting pressurized cold air toward the spindle and the cutting tool;

air suction means for sucking and discharging the introduced outside air and the injected pressurized cold air together with cutting chips; and swirl means for generating swirling of the introduced outside air and the injected pressurized cold air within the hood.

In the cooling and dust collecting apparatus thus constituted, the pressurized cold air is blown to the surroundings of the cutting tool enclosed within the hood in the tangent direction of the cutting tool so as to cool not only the portion hidden in the workpiece but also the portion exposed outside of the workpiece and at the same time the cutting chips are discharged through suction duct the by the help of the swirl flow of the air blown from the cold air outlet holes and the outside air introduced through the guide blades.

DETAILED DESCRIPTION OF PREFERRED EMBODIMENTS

Referring now to FIGS. 1 to 5, an embodiment of a cooling and dust collecting apparatus applied to a centering machine will be described hereinafter.

Figure 5:
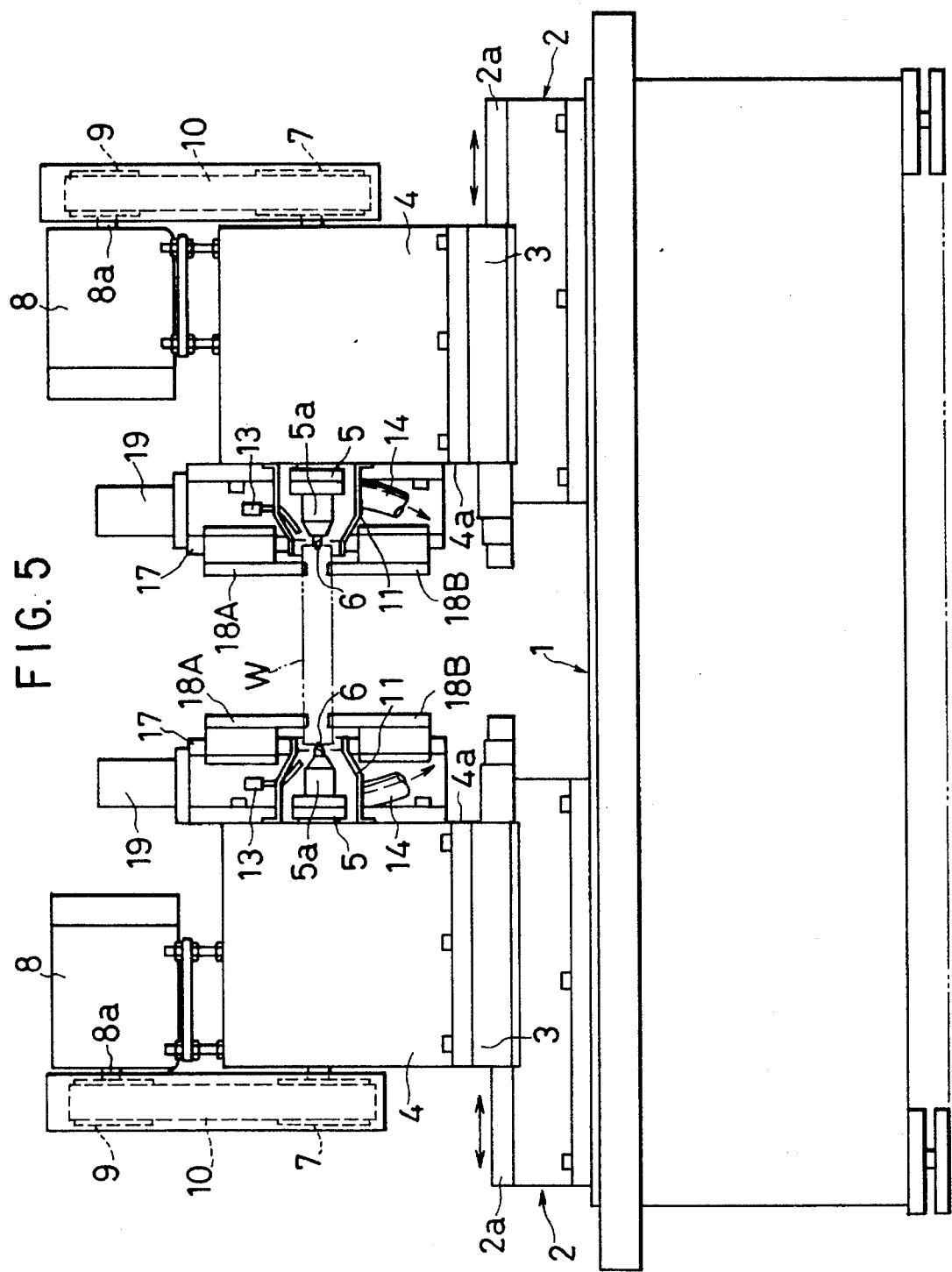
FIG. 5 is an overall side view showing a cooling and dust collecting apparatus mounted on a machine tool.

Referring to FIG. 5, numeral denotes a centering machine on which a pair of feed units 2 are mounted face to face. Each feed unit 2 has a guide rail 2a and a feed cylinder (not shown) with which a feed table 3 slides along the guide rail 2a. Further, a headstock 4 is mounted on the respective feed table 3. A spindle 5 is rotatably mounted on bearings (not shown) of the headstock 4. At the head of the spindle 5 a center drill 6 is detachably secured through a tool holder 5a and at the rear end of the spindle 5 a driven pulley 7 is coupled. Further, a driving pulley 9 fixed to an output axis 8a of a drive motor 8 is in communication with the driven pulley 7 through a transmission belt 10. Each drive motor 8 is mounted on each headstock 4 in such a way that the height position is adjustable.

On a front surface 4a of the headstock 4, a hood 11 is installed coaxially with the spindle 5. The hood 11 is so composed as to be able to be divided into two pieces along a radial line thereof. Further, at the opening portion 11a of the hood 11 a plurality of guide blades 12 are radially arranged equally spaced apart. Each of guide blades 12 has a specified attack angle so as to give a swirl motion to the introduced air. Further, a cold air injection pipe 13 penetrates the outer periphery of the hood 11. The center line of the cold air injection pipe 13 is directed in the tangent direction of an imaginary circle around the center drill 6. The pressurized cold air is injected in the tangent direction of the circle of the center drill 6 and in the opposite direction to the rotational direction of the center drill 6.

Furthermore, an inlet port 14a of a suction duct 14 is provided in the tangent direction of the hood 11 and an outlet port of the suction duct 14 is connected to a vacuum type dust collecting device (not shown). As referred to FIG. 2, the direction of the air flow through the suction duct 14 is identical with the direction of the air flow formed by the injected air from the cold air injection pipe 13.

When the dust collecting device is operated, air is sucked from inside of the hood 11 through the suction duct 14, and then a swirl flow is generated in the hood 11 by a deflected air stream passing through the guide blades 12. By means of this swirl flow the drill 6 is cooled and at the same time cutting chips are floated up and then discharged through the suction duct 14 together with air.

Since the hood 11 is divided into an upper part and a lower part connected with a hinge, the replacement of the center drill 6 can be performed easily by opening the upper part of the hood 11 after removing bolts 16 tightening the upper part.

Figure 1:
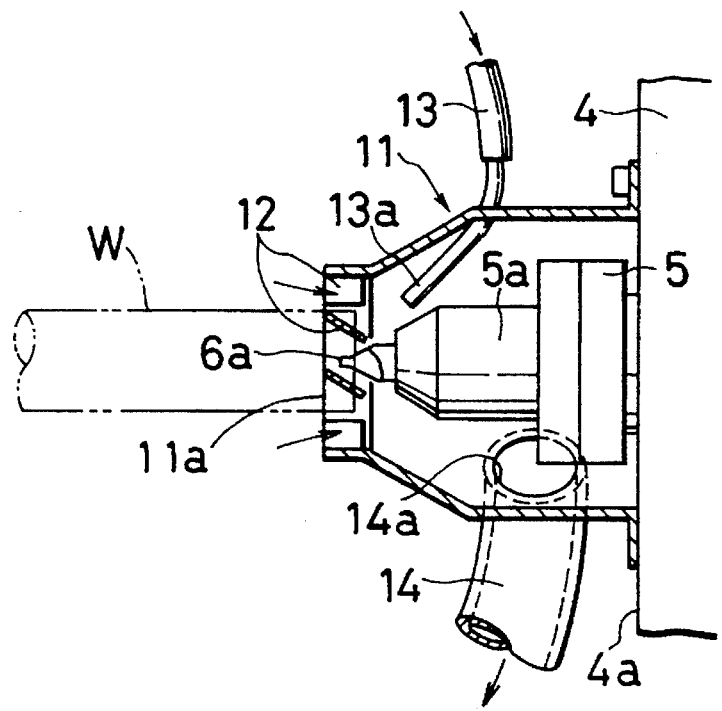
FIG. 1 is a schematic side sectional view showing an embodiment of a cooling and dust collecting apparatus for machine tools according to the present invention.
Figure 2:
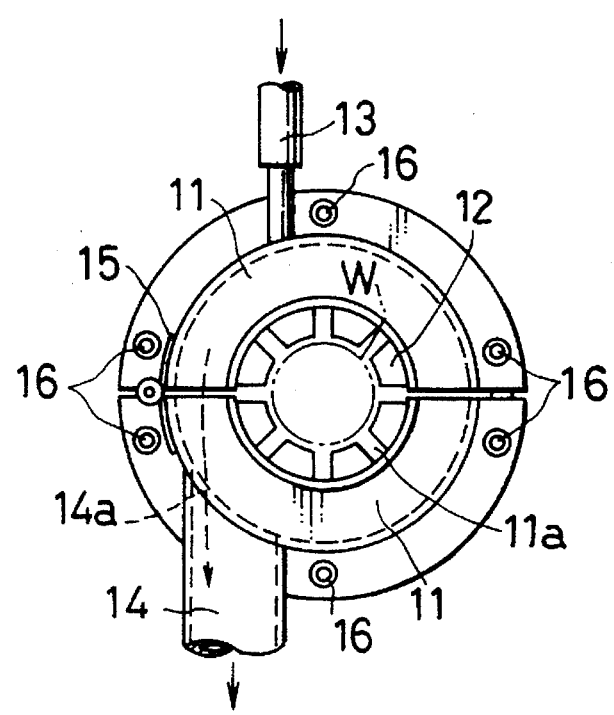
FIG. 2 is an elevational view showing an embodiment of a cooling and dust collecting apparatus for machine 18 tool according to the present invention.
Figure 3:
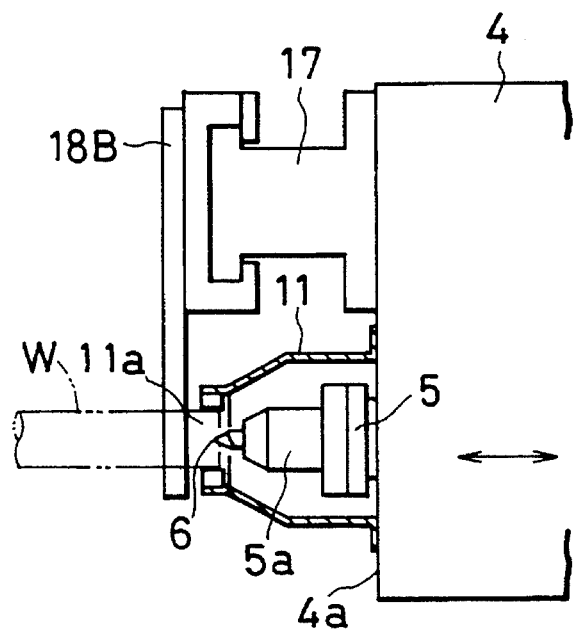
FIG. 3 is a top partial view showing an embodiment of a cooling and dust collecting apparatus for machine tool according to the present invention in the state of clamping a workpiece.
Figure 4:
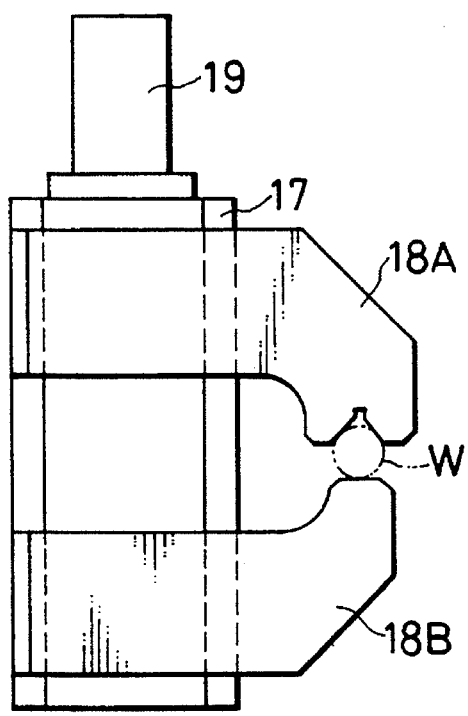
FIG. 4 is an elevational view showing a clamp section.

Referring to FIG. 3, a vertical guide rail 17 is mounted on the inner surface 4a of the headstock 4 respectively and one pair of clamps 18a and 18b are slidably mounted on the vertical guide rail 17. The clamps 18 holds a workpiece W at the centering position by the force of a respective hydraulic cylinder 19.

Next, operation of the cooling and dust collecting apparatus for machine tools according to the present invention will be described.

First, a workpiece is held with clamps 18a and 18b at both ends of the workpiece by operating each hydraulic cylinder 19 for the cramp.

Then, the drive motor 8 is switched on to rotate the center drill 6. After adjusting the tip of the center drill 6 to the center of the workpiece W for both ends, the workpiece is drilled for centering. During the drilling process, the cold air is injected from the cold air injection pipe 13 in the tangent direction of the center drill 6 to not only the portion exposed outside but also the portion hidden in the workpiece W. Further, when the pressurized cold air is discharged through the suction duct 14, the pressurized cold air swirls within the hood 11 and at the same time the outside air is introduced into the hood 11 in a swirl stream through the guide blades 12, As a result, cutting chips are floated away, sucked and discharged through the suction duct 14.

In the embodiment above mentioned, the center drill is provided at both ends of the workpiece, however an embodiment of the case where the center drill is provided only at one side can also operate in this manner. Further, the drilling process is not limited to centering work as described hereinbefore and therefore the drilling process can be applied to normal drilling or cutting work.

In summary, as described before, the cooling and dust collecting apparatus for a machine tool according to the present invention is characterized in that: the hood is provided in such a way so as to enclose the spindle and the cutting tool; the pressurized cold air is injected to the drill from the cold air injection pipe in the tangent direction of the drill; the outside air is introduced through the guide blades; and the air within the hood is forcedly discharged through the suction duct, so that not the edge portion of the cutting tool but also the spindle portion can be cooled. Further, since the cooling and dust collecting apparatus is constituted in such a way that the pressurized cold air and the outside air are introduced in the tangent direction of the hood, cutting chips can be discharged by the force of the swirl flow without cutting chips heaping up inside the hood.

While the presently preferred embodiment of the present invention has been shown and described, it is to be understood that this disclosure is for the purpose of illustration and that various changes and modifications may be made without departing from the scope of the invention as set forth in the appended claims,

We claim:

1. A cooling and dust collecting apparatus for a machine tool having, a headstock mounted on a feed table via a guide rail of said machine tool, a spindle protruded from said headstock for chucking a cutting tool, a pair of clamps attached on said headstock via a rail for supporting a workpiece, and a hood for covering said spindle and said cutting tool in order to prevent cutting chips from scattering therearound, comprising:

cold air injecting means penetrated into said hood and directed to a cutting portion of said workpiece for injecting cold air in a tangential and reverse rotational direction of said cutting tool so as to directly cool down said cutting portion;

air suction means connected to said hood adjacent to a connecting portion between said headstock and said hood for suction of and discharging said cutting chips away with said cold air to outside of said hood; and a plurality of guide blades formed on an inside wall of an open portion of said hood in a spiral direction of said cold air for inducing a spiral flow from said opening portion to said connecting portion of said air suction means so as to effectively cool down said cutting tool and said workpiece and to keep a surrounding environment clean by forcibly eliminating said cutting chips with spiral flow from said cutting portion.

2. The apparatus according to claim 1, wherein said plurality of guide blades have a specified attack angle for strengthening said swirl generated by said swirl means.

3. The apparatus according to claim 1, wherein said cold air injecting means have at least one air injection pipe provided within said hood for injecting pressurized cold air in the tangential direction of said cutting tool an in the opposite direction to the rotational direction of said cutting tool.

4. The apparatus according to claim 1, wherein said pressurized cold air is injected in the same direction as the rotational direction of said swirl.

5. The apparatus according to claim 1, wherein said hood is divided into two pieces so as to facilitate the replacement of said cutting tool.

6. A cooling and dust collecting apparatus for a machine tool comprising a headstock mounted on a feed table via a guide rail of said machine tool, a spindle protruded from said headstock for chucking a cutting tool, a pair of clamps attached on said headstock via a rail for supporting a workpiece, and a hood for covering said spindle and said cutting tool in order to prevent cutting chips from scattering therearound, a cold air injecting means penetrated into said hood and directed to a cutting portion of said workpiece for injecting cold air in a tangential and reverse rotational direction of said cutting tool so as to directly cool down said cutting portion;

air suction means connected to said hood adjacent to a connecting portion between said headstock and said hood for suction of and discharging said cutting chips away with said cold air to outside of said hood; and a plurality of guide blades formed in a spiral direction on an inside wall of an opening portion of said hood for inducing a spiral flow of air inducted from said opening portion to said air suction means so as to effectively cool down said cutting tool and said workpiece and to keep a surrounding environment clean by forcibly eliminating said cutting chips with spiral flow from said cutting portion.

7. The apparatus according to claim 6, wherein said cold air injecting means have at least one air injection pipe provided within said hood for injecting pressurized cold air in the tangential direction of said cutting tool and in the opposite direction to the rotational direction of said cutting tool.

8. A cooling and dust collecting apparatus for a machine tool having a headstock mounted on a feed table via a guide rail of said machine tool, a spindle protruded from headstock, a tool holder attached to said spindle, a center drill attached to said tool holder, a pair of clamps attached on said headstock via a rail for supporting a workpiece, and a hood for covering said spindle, tool holder and center drill in order to prevent cutting chips from scattering outside of said apparatus comprising:

cold air injecting means penetrated into the interior of said hood and directed to said spindle for injecting cold air in a tangential direction with respect to an imaginary circle around said center drill, and in reverse rotational direction of said center drill, air suction means connected to and opening into said hood for suction of and discharging said cutting chips away to outside of said hood; and a plurality of guide blades formed on an inside wall of an open portion of said hood, said blades having an attack angle so as to impart a spiral direction to air sucked into said hood from said open portion and for inducing a spiral flow to said air entering from said open portion so as to effectively cool down said cutting tool and said workpiece and to keep a surrounding environment clean by forcibly eliminating said cutting chips with said spiral flow to said air suction means.

9. A cooling and dust collecting apparatus for a machine tool comprising a headstock mounted on a feed table via a guide rail of said machine tool, a spindle protruded from said headstock, a tool holder attached to said spindle, a center drill attached to said tool holder, a pair of clamps attached on said headstock via a rail for supporting a workpiece, and a hood for covering said spindle in order to prevent cutting chips from scattering outside of said apparatus, cold air injecting means penetrated into the interior of said hood and directed to said spindle for injecting cold air in a tangential direction with respect to an imaginary circle around said center drill, and in reverse rotational direction of said center drill so as to directly cool down said cutting portion;

air suction means connected to and opening into said hood for suction of and discharging said cutting chips away to outside of said hood; and a plurality of guide blades formed on an inside wall of an open portion of said hood, said blades having an attack angle so as to impact a spiral direction to air entering said hood from said open portion for inducing a spiral flow to said air from said open portion so as to effectively cool down said cutting tool and said workpiece and to keep a surrounding environment clean by forcibly eliminating said cutting chips with said spiral flow to said air suction means.

\* \* \* \* \*